United States Patent [19]

Schwartz

[11] Patent Number: 4,756,424
[45] Date of Patent: Jul. 12, 1988

[54] MULTIPURPOSE CONTAINER ASSEMBLY FOR PREPARATION OF BEVERAGES

[75] Inventor: Charles M. Schwartz, Canoga Park, Calif.

[73] Assignee: Chaspo Industries, Inc., Los Angeles, Calif.

[21] Appl. No.: 882,467

[22] Filed: Jul. 7, 1986

[51] Int. Cl.⁴ .................. B65D 85/62; A45C 11/20
[52] U.S. Cl. ......................... 206/542; 206/217; 206/499; 215/6; 220/4 E; 220/20.5
[58] Field of Search .................. 215/6, 13 R; 206/541–546, 549, 499, 500, 821, 217, 568; 220/4 D, 4 C, 4 E, 20, 352, 23.83, 23.86, 20.5

[56] References Cited

U.S. PATENT DOCUMENTS

| | | | |
|---|---|---|---|
| 1,463,360 | 7/1923 | Foote | 220/23.83 X |
| 2,328,543 | 9/1943 | Bauman | 206/821 X |
| 3,093,238 | 6/1963 | King III | 206/541 |
| 3,152,691 | 10/1964 | Hultgren | 220/352 X |
| 3,180,537 | 4/1965 | Collins | 206/821 X |
| 3,266,623 | 8/1966 | Poferl | 206/499 X |
| 3,317,087 | 5/1967 | Landis | 206/821 X |
| 3,327,881 | 6/1967 | Maier | 215/6 |
| 3,885,672 | 5/1975 | Westenrieder | 206/821 X |
| 4,094,408 | 6/1978 | Ford | 220/4 D X |
| 4,119,231 | 10/1978 | Johnson | 215/6 |
| 4,308,952 | 1/1982 | Paulucci | 206/499 X |
| 4,444,324 | 4/1984 | Grenell | 215/6 |
| 4,598,832 | 7/1986 | Alonso | 215/6 |

Primary Examiner—Stephen Marcus
Assistant Examiner—Bryon Gehman
Attorney, Agent, or Firm—Poms, Smith, Lande & Rose

[57] ABSTRACT

A multipurpose container assembly adapted for use in preparation of beverages and for storage of beverage ingredients comprising at least a pair of mugs or cups frictionally held in opposed relation by a connector coupling to provide a closed container assembly providing storage in one of the cups for one or more receptacles adapted to contain beverage making ingredients such as coffee and to store an electrical heating element for heating the beverage.

2 Claims, 1 Drawing Sheet

MULTIPURPOSE CONTAINER ASSEMBLY FOR PREPARATION OF BEVERAGES

BACKGROUND OF THE INVENTION

The present invention relates to a multi-purpose container assembly useful while traveling, particularly in an automobile or similar vehicle, to provide facilities for preparing and brewing a selected hot beverage such as coffee, tea, cocoa, bullion, and the like.

Some hotels and motels provide electrical heating facilities within their rooms for the preparation of a cup of hot coffee. Packets of instant coffee are provided for mixing with heated water. Some people are quite selective about the brands of coffee which they prefer to drink. It therefore becomes desirable to brew a beverage of one's particular liking and to carry on such travels one's own brand of beverage, sugar or sugar substitute, cream or substitutes therefor and be able to quickly brew a hot drink upon arrival at a room in a motel or upon stopping at a rest camp on the road.

SUMMARY OF INVENTION

The present invention relates to a novel multipurpose container assembly for use as a travel accessory which is adapted to contain and store all of the ingredients (except liquid) for preparation of a selected hot beverage or drink.

An object of the invention is to provide a multiple purpose container assembly which provides at least two drinking cups or mugs, storage capacity for various ingredients for making beverages, and storage for a portable electrical heating device.

A further object of the invention is to provide a multi-purpose container assembly for use as a travel accessory in which two cups in juxtaposed relation are frictionally fitted together and provide storage capacity for containing beverage making ingredients while in assembly.

Another object of the invention is to provide a container assembly in which at least two cups are held together by friction so that they may be readily separated for use as drinking cups and while in assembly are frictionally held together to serve as storage containers for selected beverage making ingredients.

A further object of the invention is to provide a novel connector member or coupling adapted to retain a pair of cups in assembled relation while providing an elongated cylindrical appearance of substantially uniform diameter.

A more particular object of the invention is to provide a connector or coupling member for two cups which retains the cups in desired assembled relation and which confines receptacles in one of the cups within such associated cup.

Various objects and advantages of the present invention will be readily apparent from the following description of the drawings in which an exemplary embodiment of the invention is shown.

Figure 1:
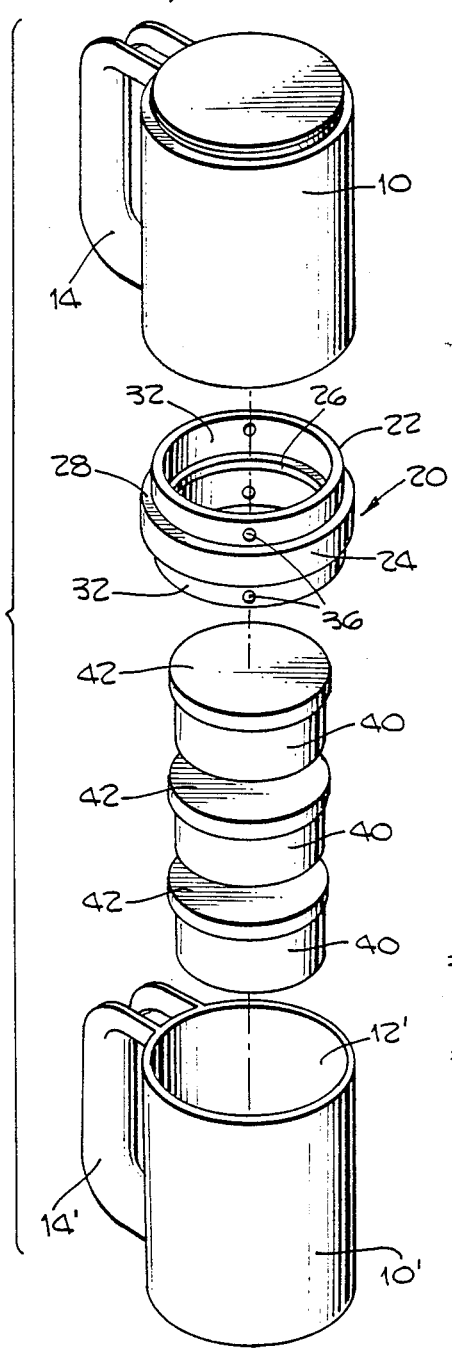
FIG. 1 is an exploded perspective view of a container assembly embodying this invention.

In the exploded perspective view shown in FIG. 1, a pair of identical mugs or cups 10, 10' are shown in opposed juxtaposed relation with cup openings 12 and 12' facing each other. Each cup 10 may be provided with a suitable conventional handle 14, 14'. Each of cups 10, 10' may be molded from suitable plastic heat resistant material and side walls thereof are slightly resiliently yieldable adjacent cup openings 12, 12'. The bottom wall 16, 16' of said cups may include a rabbeted edge 18, 18' adapted to permit stacking of the cups in upright position.

Figure 2:
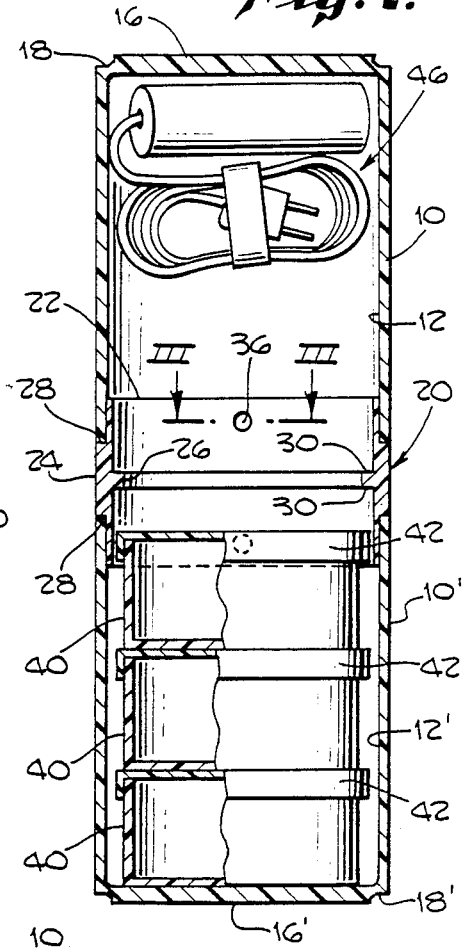
FIG. 2 is a longitudinal sectional view of the container assembly in assembled relation, this section being taken in a longitudinal plane passing through the axis of the assembly.
Figure 4:
FIG. 4 is a fragmentary sectional view taken in the plane indicated by line IV of FIG. 3.
Figure 3:
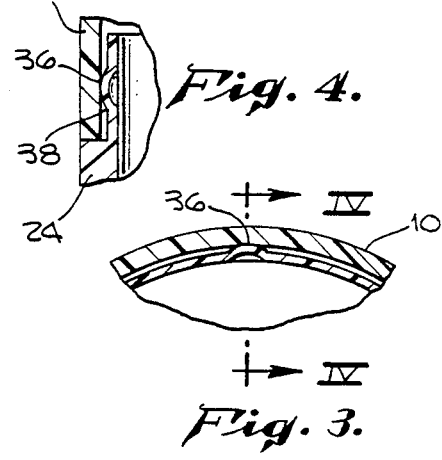
FIG. 3 is a fragmentary sectional view taken in the plane indicated by line III of FIG. 2.

A coupling or connector means generally indicated at 20 is shown between the cups in both FIG. 1 and FIG. 2. The connector means 20 includes a cylindrical member 22 having a central portion 24 having a cylindrical external surface and an internal cylindrical surface including a radially inwardly directed annular rib 26. The annular rib 26 defines oppositely directed internal shoulders 30. The connector means 20 also includes cylindrical end portions 32 defining with the central portion 24 oppositely directed external shoulders 28. The end portions 32 have an outer diameter adapted to be received within the internal diameter of the cup 10. As shown in FIG. 2, the cup openings receive the cylindrical end portions 32 and the cup edges are abutted against the shoulders 28 in assembly. The central portion 24 of the connector is provided an outer diameter which corresponds to the outer diameter of cups 10.

Means to facilitate frictionally holding the cups 10, 10' in assembly with the connector coupling member 20 may include a pair of generally diametrically opposite protuberances 36 formed in the cylindrical end portions of the connector coupling 20. Preferably, the protuberances 36 are provided with a sloping cam face 38 directed away from the external shoulders 28 so that as a cup 10 moves toward the connector 20 the frictional engagement of the cup walls with the protuberances 36 increases to frictionally hold the cups in assembly with the connector 20 while at the same time permitting facile release of the cups from the connector 20 without application of substantial manual force to the cups. While only a pair of diametrically opposite protuberances 36 are shown, it will be understood that additional protuberances 36 may be provided or other means may be provided for releasably frictionally holding the cups 10, 10' in assembly with the connector.

As illustrated in FIG. 2, the assembled cups and connector provide a continuous open chamber from one end wall 16 to the other end wall 16' of the opposite cup. Within cup 10' as illustrated, a plurality of receptacles 40 of relatively shallow depth may be stacked one upon the other within the chamber of cup 10'. Each receptacle 40 includes a cover 42 frictionally retained on its associated receptacle 40. The outer diameter of cover 42 is greater than the inner diameter of the internal central portion 26 and the uppermost container cover 42 is adapted to abut against the internal shoulder 30 in order to retain the several receptacles 40 substantially within cup 10'. Thus, during travel and changes in position of the assembled container, the several cups 40 will be retained within cup 10' and will not will not move into the chamber of cup 10.

Each of the receptacles 40 may contain a beverage making ingredient such as coffee, sugar, powdered cream, or other beverage making ingredients according to the desire of the individual.

Schematically illustrated in upper cup 10 of FIG. 2 is an electrically operated heating device which is generally loosely contained within cup 10. Such electrical heating device generally indicated at 46 may comprise an electrical heating element of the type adapted to be immersed within a liquid such as water, a cord and a plug for insertion into an electrical receptacle. The electrical receptacle not shown may be in the wall of the motel room or such a plug may be of the type for insertion into the receptable for a cigarette lighter in an automobile if it is desired to utilize the beverage making assembly in the vehicle. It will be understood that various types of electrical heating devices may be provided for this purpose.

The utility of the multi-purpose container assembly is readily apparent in that it in a sense provides a "room service" feature for use in traveling and at any location where a source of electricity is available for heating liquids. The pair of cups together with the connector provide a chamber or compartment for storage of beverage making ingredients. Such storage compartment is secure by the frictional fitting of the cups on the connector 20. Removal of the cups from the connector provide accessibility to the beverage ingredients and the heating device and provides a pair of cups for holding the beverage to be made.

It will be apparent that various modifications and changes may be made in the container assembly described above which come within the spirit of this invention and all such changes and modifications coming within the scope of the appended claims are embraced thereby.

I claim:

1. A multi-purpose container assembly for use as a travel accessory comprising in combination:

a pair of cups, each cup having a side wall provided with an external side surface configuration, an end closure wall, and an open end;

a receptacle means adapted to be stored and carried within one of said cups;

a connector means having a central portion having an external surface configuration corresponding to the external side surface configuration of the side wall, said central portion having an internal surface configuration including a radially inwardly directed projection providing a stop surface for co-action with said receptacle means to retain said receptacle means in one of said cups;

said connector means including oppositely directed end portions receivable within said open ends of said cups in assembly therewith;

said end portions of said connector means defining with said central portion external shoulder surfaces for abutment of edges of said cups;

said end portions including spaced radially outwardly directed protuberances adjacent said external shoulders for frictional releasable retention of said cups in assembly with said connector means;

said receptacle means being slidable within one of said cups and having an external dimension exceeding the internal dimensions of said radially inwardly directed projections for restricting longitudinal movement of said receptacle means in said cup.

2. A container assembly as claimed in claim 1 wherein said receptable means includes a plurality of containers each having an external dimension exceeding the internal dimensions of said radially inwardly directed projections for restricting longitudinal movement of said plurality of containers.

* * * * *